United States Patent [19]

Hickok

[11] Patent Number: 4,750,054
[45] Date of Patent: Jun. 7, 1988

[54] NOISE-IMPERVIOUS VIDEO TIMING RECOVERY AND AUTOMATIC SKEW COMPENSATION

[75] Inventor: William K. Hickok, Rochester, N.Y.
[73] Assignee: Eastman Kodak Company, Rochester, N.Y.
[21] Appl. No.: 915,487
[22] Filed: Oct. 6, 1986
[51] Int. Cl.$^4$ .............................................. H04N 5/95
[52] U.S. Cl. .................................... 358/337; 360/36.1
[58] Field of Search .............. 358/319, 323, 326, 337, 358/339; 360/26, 36.1, 36.2, 37.1

[56] References Cited

U.S. PATENT DOCUMENTS

| | | | |
|---|---|---|---|
| 3,609,223 | 9/1971 | Tajiri et al | 358/323 |
| 3,962,725 | 6/1976 | Lemke et al. | 360/36.1 |
| 4,084,176 | 4/1978 | Trost | 358/323 |
| 4,115,800 | 9/1978 | Sakamoto | 358/323 X |
| 4,257,073 | 3/1981 | Tatami | 360/36.1 X |
| 4,330,846 | 5/1982 | Colles et al. | 360/36.2 X |
| 4,360,824 | 11/1982 | Takahashi et al. | 358/323 |
| 4,489,287 | 12/1984 | Nagumo et al. | 360/36.2 X |
| 4,525,754 | 6/1985 | Handley | 360/36.2 X |
| 4,667,240 | 5/1987 | Willis et al. | 358/337 X |

Primary Examiner—W. B. Perkey
Attorney, Agent, or Firm—Robert M. Wallace

[57] ABSTRACT

Timing in a time division multiplex video cassette recorder is improved and skew jump error is virtually eliminated by recording video signals with a superimposed pilot signal synchronized to—but having a frequency greater than—the incoming horizontal sync pulse frequency. During playback, a local pilot signal—similar to the previously recorded superimposed pilot signal—and a local horizontal sync signal control the de-multiplexing process and timing. The local pilot and horizontal sync signals are controlled by a three-tiered feedback timing control loop: a phase lock loop varies a local clock signal in order to correct very fine time differences between the recorded and local pilot signals; a digital loop changes the frequency ratio between the clock signal and the local pilot signal to correct larger time differences between the recorded and local horizontal sync pulse signals; and a look-ahead up/down counter counts and stores the net cumulative change in the pulse repetition frequency ratio. The ratio is changed by the entire cumulative amount during (or just prior to) the first horizontal line (only) of each video field as a very large automatic correction which anticipates skew jump error. The phase lock loop is virtually unaffected by interruption of the digital control loop (due to temporary drop-outs of the imcoming horizontal sync pulse signal), and the systm timing is therefore impervious to dropouts or noise.

39 Claims, 11 Drawing Sheets

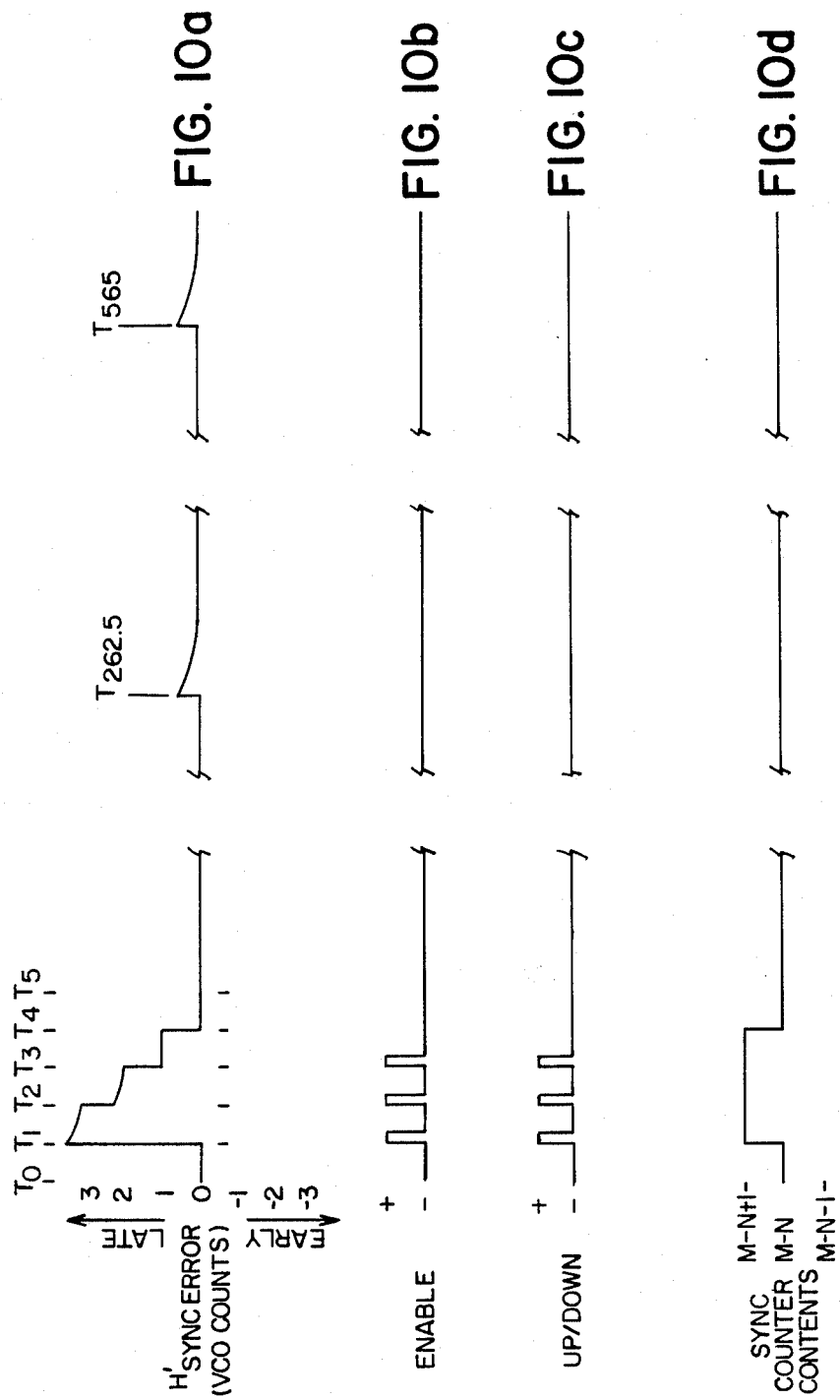

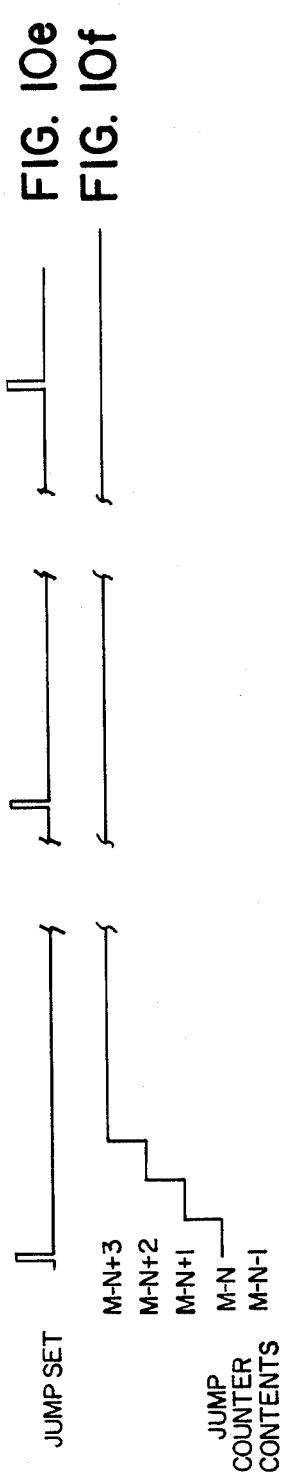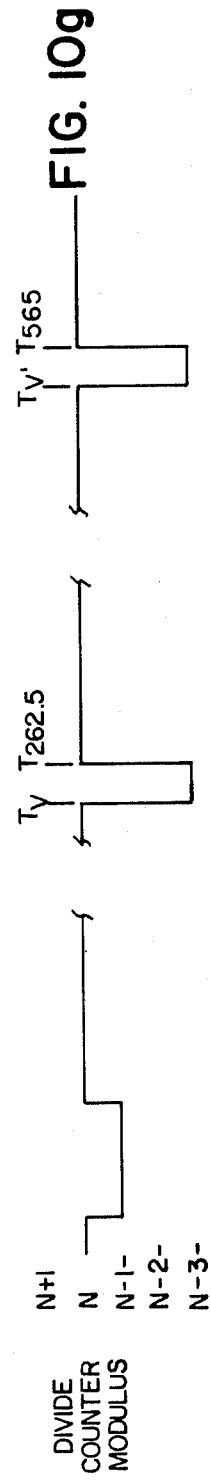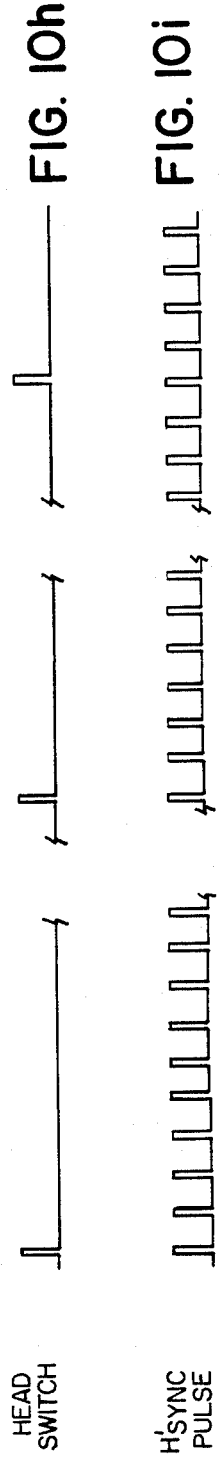

NOISE-IMPERVIOUS VIDEO TIMING RECOVERY AND AUTOMATIC SKEW COMPENSATION

BACKGROUND OF THE INVENTION

1. Technical Field

The invention is related to time division multiplex (TDM) video cassette recorders (VCR's) and tape players wherein video timing and synchronization signals must be reconstructed or recovered over noise and other distortion.

TDM recording techniques in which the present invention finds use are not necessarily restricted to VCR's but are useful in magnetic disk recording and optical disk recording, for example. Various TDM VCR's are disclosed in U.S. Pat. No. 4,300,161 and in U.S. patent application Ser. No. 725,873, filed on Apr. 22, 1985, entitled "Video Reproducing Apparatus" by Carl N. Schauffele.

2. Description of the Related Art

Superimposing pilot pulses on a video signal for various reasons is well-known in the art. For example, U.S. Pat. Nos. 4,360,824 and 3,962,725 teach recording a pilot signal on its own separate track on the video tape. U.S. Pat. No. 4,115,800, teaches recording a pilot signal having a frequency less than the horizontal line frequency $f_H$. U.S. Pat. No. 4,084,176, teaches recording a pilot pulse at a frequency greater than the FM carrier frequency $f_c$, and phase locking the pilot pulse to the colorburst during playback. A disadvantage of this latter teaching is that a pilot signal recorded at a frequency higher than $f_c$ is subject to well-known high frequency losses characteristic of the magnetic tape media.

3. Description of the Problems of the Related Art

Unreliable Sync Pulses

Loss of timing or synchronization pulses is a well-known problem in video cassette recorder (VCR) technology. This problem is particularly acute in VCR systems employing time division multiplexing (TDM) in which the luminance and chrominance signals are compressed in time prior to being recorded. Typically, the timing circuits of a VCR rely on video horizontal synchronization pulses ($H_{sync}$) to produce and synchronize timing pulses used, for example, to control time division multiplexing during recording and playback in the well-known manner. The problem with this technique is that the $H_{sync}$ pulses are not reliable. For example, during playback, drop-outs in the video signal may cause an absence of one or more of a succession of $H_{sync}$ pulses, so that timing synchronization between the VCR timing circuits and the recorded video signal may be lost for one or more horizontal lines in a given video frame. Furthermore, the leading edge of the $H_{sync}$ pulses may be corrupted or masked by white noise or FM burst noise, or may even be mimicked by impulse noise spikes.

Skew Error

An effective change in tape length between recording and playback (due to a change in tape tension) causes a timing ("skew") error to accumulate (grow) steadily during recording across one complete tape track. This skew error is therefore different at the two ends of each track but is repetitive from track to track. (In fact, this repetitive pattern changes very slowly, due to the inertia of the head and drum assembly.) The accumulated skew error causes an abrupt timing jump at one end of each track just when the heads are switched and recording begins at the other end of the next track. Such errors may cause a horizontal shift or "flag waving" at the top of the video image. Typically, the solution to this problem is to provide a mechanical adjustment to the tape tension, a particularly awkward nuisance to the consumer.

Skew errors distort the horizontal sync pulse of the video signal. A TDM VCR must rely on the sync pulses for timing and control. The effect of skew error is greatly exacerbated in a TDM VCR. TDM circuits typically include digital storage devices which require consistent timing pulses of extremely fine accuracy to avoid catastrophic distortions of the video signal. For example, the chrominance signal is time compressed in a TDM VCR by a factor of about 6 (typically), so that any deviation in timing is increased six-fold.

SUMMARY OF THE INVENTION

The foregoing problems are solved in an apparatus embodying the invention, such apparatus being an improved VCR timing recovery system.

Solution to the Problem of Unreliable Sync Pulses

A pilot signal is superimposed on an FM modulated time division multiplexed video signal and the two are then recorded together. The pilot signal frequency $f_p$ is greater than the frequency $f_H$ of the video signal $H_{sync}$ pulses and below the lowest usable FM sideband of the video signal being recorded. During playback, a three-tiered feedback control loop uses the $H_{sync}$ pulses of the video signal and the recorded pilot signal to reliably reconstruct timing signals for the de-multiplexing process in a manner virtually unaffected by any temporary loss of the previously recorded pilot pulse or $H_{sync}$ pulse.

First, the three-tiered control loop includes a "fine" timing control loop comprising a phase lock loop controlling the output of a voltage controlled oscillator ("VCO") of frequency $f_{VCO}$. The phase lock loop compares the phases of the recorded pilot pulses and reference pilot pulses derived from the VCO.

Secondly, the three-tiered control loop includes a "coarse" timing control loop having a divider which divides down the VCO frequency $f_{VCO}$ by a particular ratio in order to generate the reference pilot pulses and reference horizontal sync pulses $H'_{sync}$ which control the time division de-multiplexing process and timing. A sync pulse comparator senses whether the reference $H'_{sync}$ pulses are early or late with respect to the recorded $H_{sync}$ pulses. The coarse control loop either increments or decrements the divider ratio by a set amount each horizontal line in which the $H_{sync}$ pulses are early or late, in response to the sync pulse comparator.

Solution to the Problem of Skew Jump Error

The three-tiered control loop also includes a look-ahead control loop having a counter which constantly accumulates the net number of changes made by the coarse control loop to the divider ratio and stores a cumulative net change, which may be a positive or negative number. This cumulative net change is added to the divider ratio at the beginning of each video field for one horizontal scan period only. This in effect anticipates any accumulated skew jump error present at the beginning of each field, thus virtually eliminating the need for large corrections during the visible or active portion of each video field. Thus, skew jump error is automatically corrected at or just before the beginning of each video field.

The fine timing control loop provides incrementally small timing corrections up to a maximum error $1/f_p$ and operates at the pilot pulse frequency $f_p$; the coarse timing control loop provides timing corrections up to a maximum error $1/f_H$ and operates at the horizontal line frequency $f_H$; and, the look-ahead control loop anticipates the accumulated skew jump error present at the beginning of each field and asserts itself during a preliminary line scan period of each video field.

Advantages

The unique choice of the pilot pulse frequency $f_p$ provides significant advantages. Because $f_p$ is greater than $f_H$, the timing recovery control loop provides corrections much more often than it could by simply relying on the previously recorded $H_{sync}$ pulse. In fact, a corrupted or unacceptable $H_{sync}$ pulse and even a recorded pilot pulse may be discarded with little or no degradation to the playback video image because the fine timing control loop provides timing corrections many times during each horizontal video line. Thus, the fine timing control loop operates independently of the coarse timing control loop to provide timing corrections during each horizontal scanning period, even while operation of the coarse timing control loop is temporarily interrupted for one (or more) horizontal scanning periods by the drop-out of one (or more) $H_{sync}$ pulses. The system is therefore virtually immune to noise and drop-outs in the $H_{sync}$ signal, a significant advantage.

Another advantage is that recording the pilot signal at a frequency less than $f_c$ reduces the tendency to lose pilot pulses through high-frequency losses characteristic of magnetic tape recording.

DESCRIPTION OF THE DRAWINGS

The invention may best be understood by reference to the accompanying drawings of which:

FIGS. 10a–10i include contemporaneous timing diagrams in an illustrative example of the operation of the playback system of FIG. 4.

DETAILED DESCRIPTION

Overall System Concept of the Invention

Figure 1:
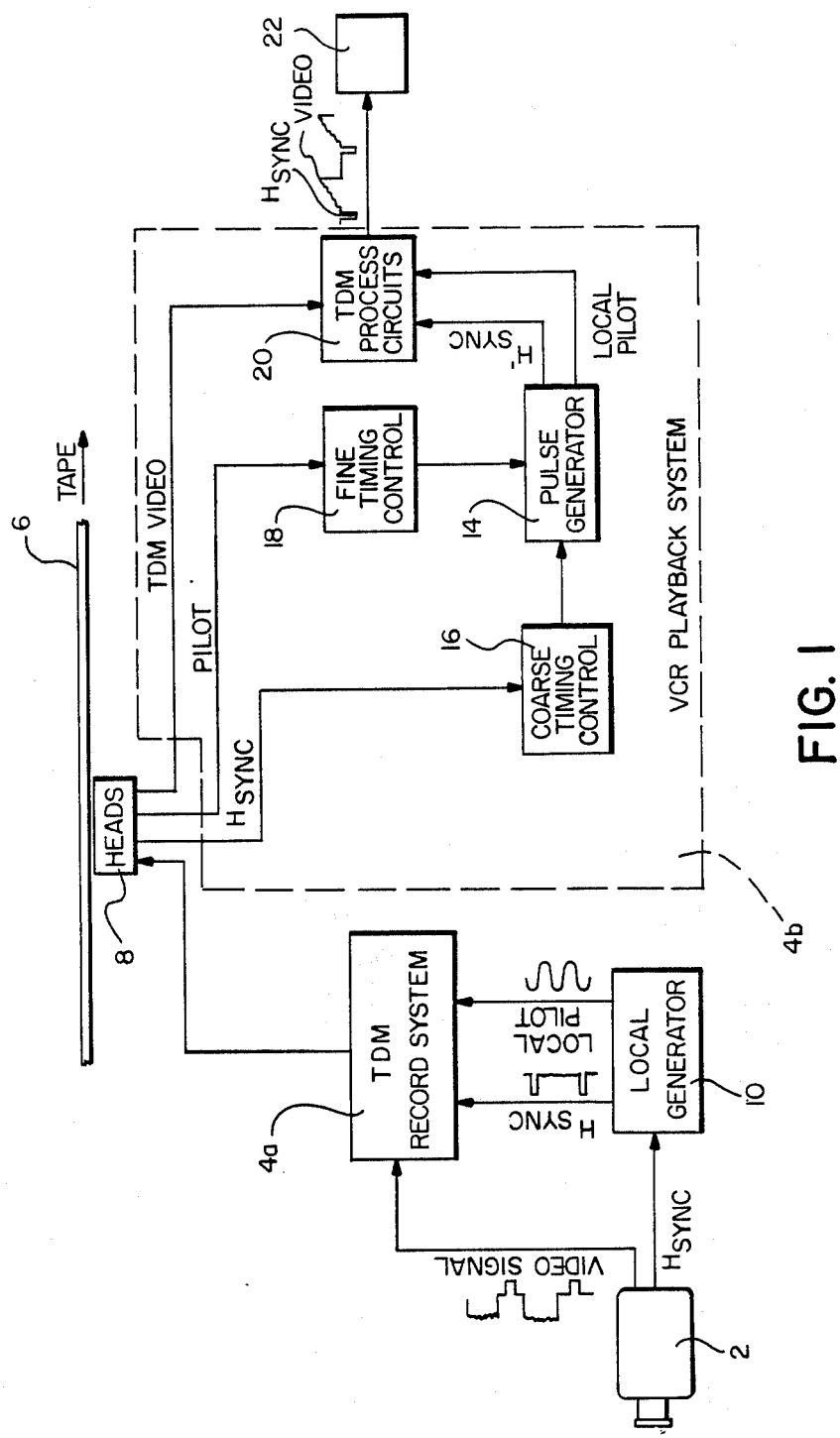
FIG. 1 is a simplified block diagram illustrating the basic concept of the invention.
Figure 2:
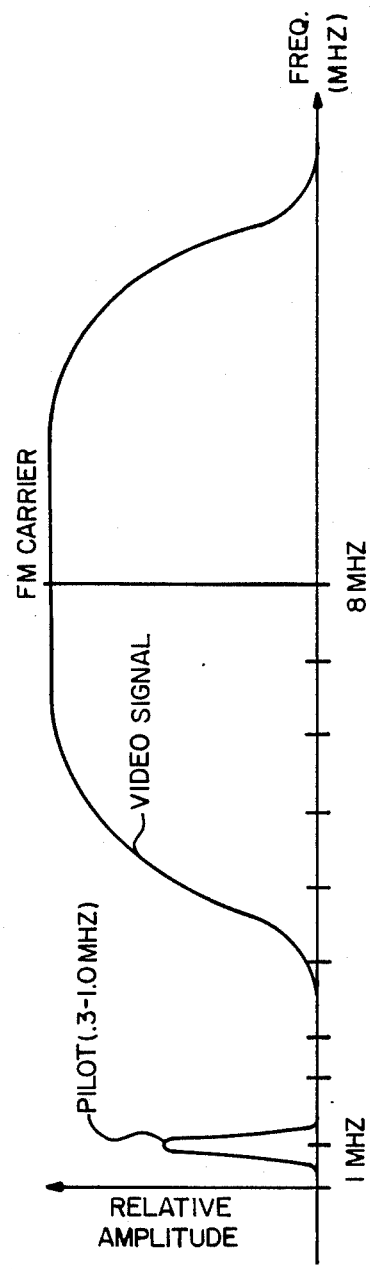
FIG. 2 is a simplified graph of the spectrum of the pilot signal and the video signal.

Referring to FIG. 1, a video signal source 2, such as a video camera, furnishes a video signal to a VCR time division multiplex recording system 4a. In this system, the incoming video signal is time division multiplexed in the well-known manner, FM converted and recorded on a video tape 6 by record heads 8. Simultaneously, a generator 10 generates a sine wave pilot signal which is recorded on the cassette tape 6 with the FM video signal. The frequency $f_p$ of the pilot signal is selected so as not to interfere with the video signal, as illustrated in FIG. 2. Specifically, the video signal is FM modulated onto an 8 MHz FM carrier signal and has a large bandwidth. The pilot frequency preferably lies between 0.3 and 1.0 MHz, which is below the lowest usable FM video signal sideband but above the horizontal sync pulse frequency $f_H$.

During playback, a playback system 4b picks up the recorded video signal, pilot signal and $H_{sync}$ pulses through the heads 8. The playback system 4b includes a local $H'_{sync}$ and pilot generator 14, the timing of which is controlled by a coarse timing control loop 16 and a fine timing control loop 18. (The record and playback systems 4a, 4b may share certain components in common. Thus, the generators 10, 14 may be a single generator, for example.) The local pilot signal and $H'_{sync}$ pulse control time division de-multiplexing circuits 20. The video signal sensed by the playback heads 12 is de-multiplexed by the time division de-multiplexing circuits 20 and fed to a receiving device 22 (such as a television receiver). The local $H'_{sync}$ pulses—rather than the recorded $H_{sync}$ pulses—provides the timing for the time sync division de-multiplexing process because the local $H_{sync}$ pulses are virtually free of tape-to-head interaction noise and skew jumps plaguing the recorded $H_{sync}$ pulses. The $H_{sync}$ pulses sensed by the heads 8 stimulate the coarse timing control loop 16 while the pilot signal sensed by the heads 8 stimulates the fine timing control loop 18.

The object of the system of FIG. 1 is to precisely control the timing of the local $H'_{sync}$ pulses. The fine timing control loop 18 compares the local pilot signal with recorded pilot signal and at least partially corrects the local pilot and $H'_{sync}$ timing once every pilot period. The coarse control loop 16 compares the local $H'_{sync}$ pulse timing with the recorded $H_{sync}$ pulse timing and at least partially corrects the $H'_{sync}$ timing once every horizontal line of the timing difference exceeds the capacity, $1/f_p$, of the fine timing control loop 18. Due to the higher repetition frequency $f_p$ of the pilot signal, temporary interruption of the operation of the coarse timing control loop 16 due to the loss of a single recorded (incoming) $H_{sync}$ pulse will not interrupt the fine timing control loop 18 and therefore will not appreciably alter playback video timing or create time base errors. Even the temporary loss of the recorded pilot signal will not appreciably alter playback video timing. For example, if one of the $H_{sync}$ pulses were missing during playback (due to problems in the previous recording or the present playback process), the playback system would still receive at least some of the pilot signal during the corresponding $H_{sync}$ pulse period and would therefore sense, from the pilot signal, any time differences occurring during that period, and respond accordingly. Thus, playback timing recovery in this invention is virtually immune from noise or drop-outs in incoming or recorded video signals, a significant advantage.

Record Mode

Figure 3:
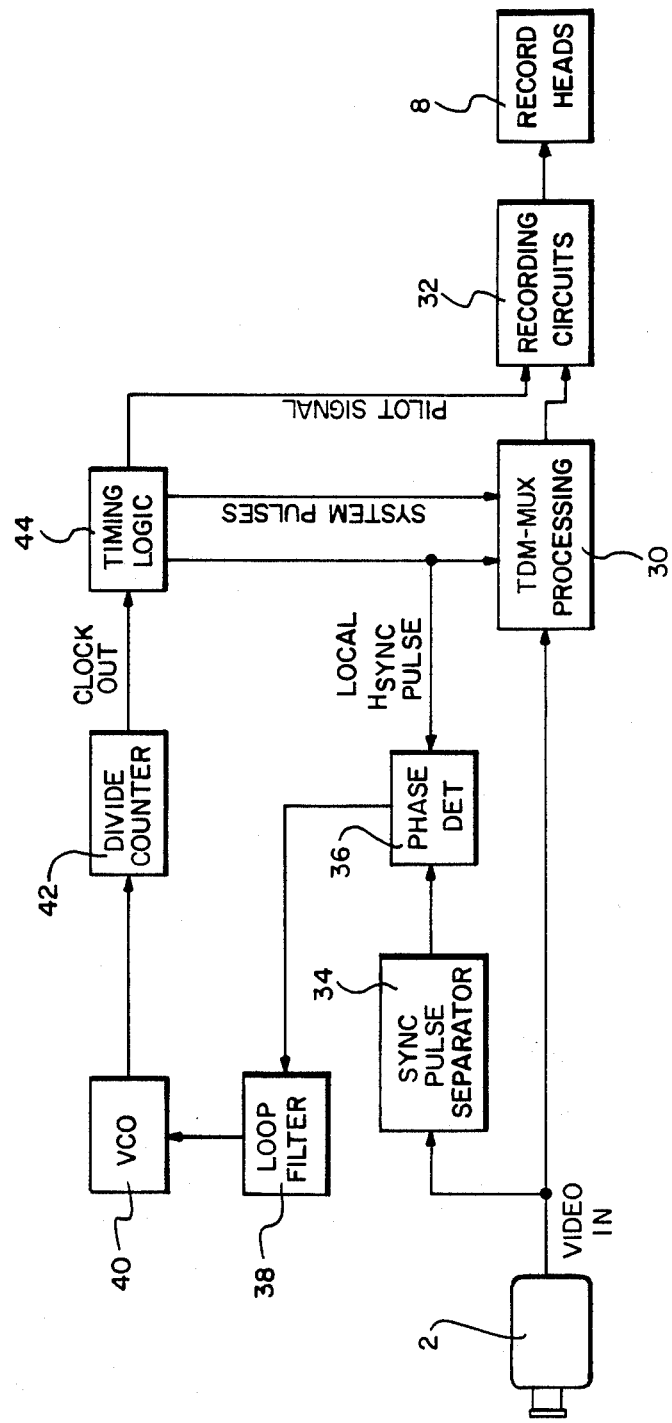
FIG. 3 is a block diagram illustrating the configuration of the system of the invention in record mode.

FIG. 3 illustrates the invention during recording of a video signal. An incoming video signal from the video source 2 is processed by prerecord processing circuits 30 and is applied through recording circuits 32 to the record heads 8. The TDM processing circuits 30 perform time division multiplexing and FM modulation of the video signal to be recorded. The prerecord processing circuits 30 and the recording circuits 32 are operated in synchronism with a voltage controlled oscillator (VCO) 40. The output of the VCO 40 is processed by a divide counter 42 and timing logic 44. The timing logic 44 produces all of the required timing signals for the TDM processing circuits 30 and the recording circuits 32, including the pilot signal and local horizontal sync pulses $H_{sync}$. The frequency of the VCO 40 is stabilized by a phase lock loop comparing the incoming horizontal synchronization pulses with the locally generated $H_{sync}$ pulses. Specifically, a sync pulse separator 34 connected to the video source 2 separates the incoming horizontal synchronization pulses from the incoming video signal in the well known manner and applies it to one input of a phase detector 36. The other input of the phase detector 36 receives the local $H_{sync}$ pulse from the timing logic 44. The output of the phase detector 36, representing the phase difference between the two sync pulse inputs, is applied through a loop filter 38 to the control input of the VCO 40. In this way, the local $H_{sync}$ pulses and the pilot pulses are maintained precisely in phase with the incoming horizontal synchronization pulse train.

The pilot signal is mixed with the FM modulated video signal and applied to the record heads 8 by the recording circuits 32.

Playback Mode

Figure 4:
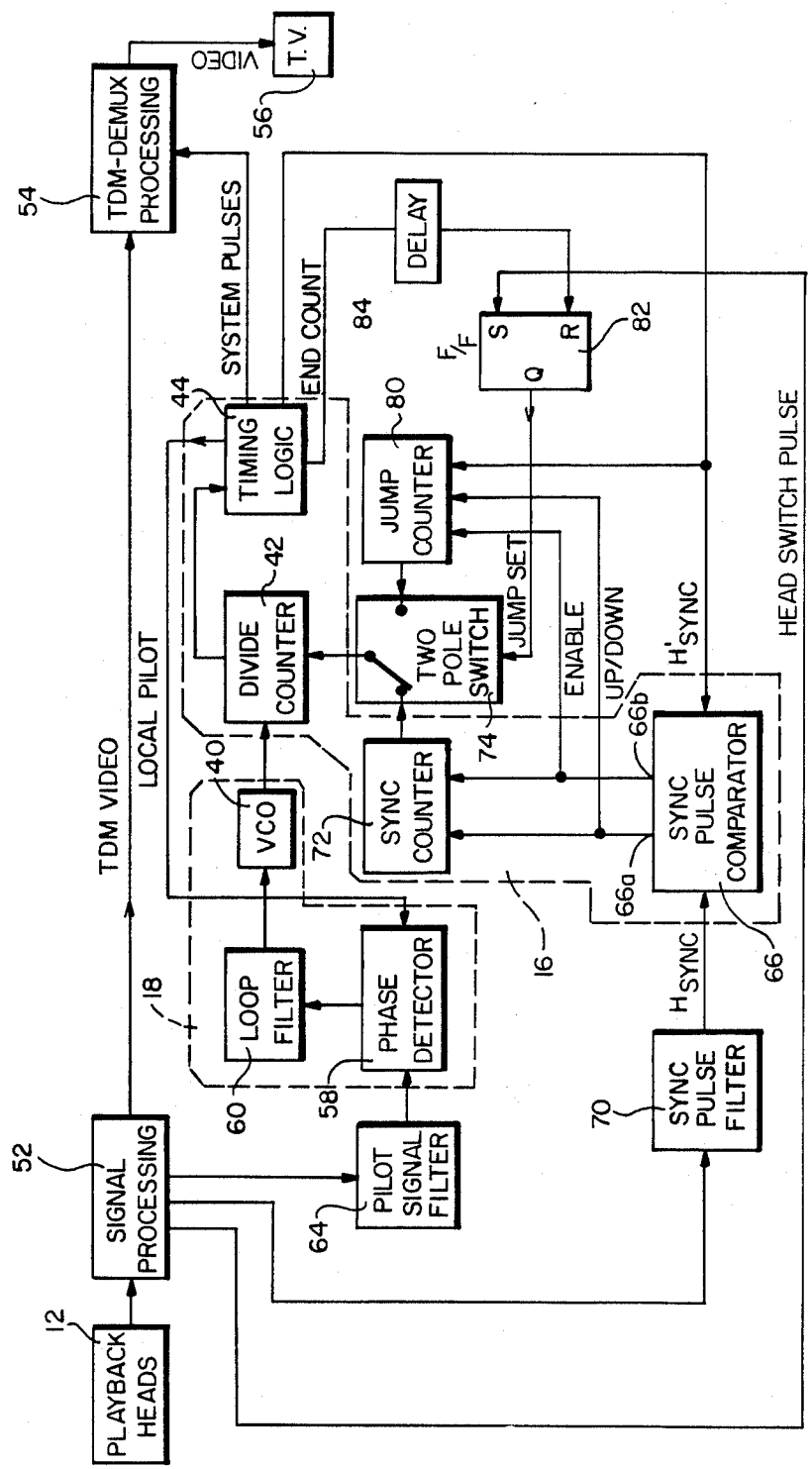
FIG. 4 constitutes a block diagram illustrating the configuration of the system of the invention in playback mode.

FIG. 4 illustrates the invention during the playback of a video signal previously recorded by the apparatus of FIG. 3. Signal processing circuits 52 receive the previously recorded video signal from the heads 8. The signal processing circuits 52 are of the type well-known in the art which (for example) perform FM demodulation of the playback video signal. The signal processing circuits 52 send the demodulated video signal to the TDM processing circuits 54 which perform time division de-multiplexing of the video signal. The TDM processing circuits 54 may be of the type described in U.S. patent application Ser. No. 915,489, filed Oct. 6, 1986, by William K. Hickok and entitled "Dual Purpose Memory for Time Division Multiplexing and Time Base Error Correction." The signal processing circuits 52 and the TDM processing circuits 54 are operated in synchronism with the VCO 40. The output of the VCO 40 is processed through the divide counter 42 and the timing logic 44 to produce all the required system timing pulses for the processing circuits 54, including a local $H'_{sync}$ pulse signal and a local pilot signal.

In one embodiment of the invention, the locally generated sync pulses of the timing logic 44, such as the $H'_{sync}$ pulse—instead of the previously recorded sync pulses such as the $H_{sync}$ pulse—accompany the base band video signal as received by a television monitor 56 or other device. This provides a more reliable timing signal to the monitor 56 free of distortion due to drop-outs and the like.

Fine Timing Control Loop

The frequency $f_{VCO}$ of the VCO 40 is controlled by the fine timing control loop 18 shown in FIG. 4. The control loop 18 comprises a phase detector 58, a loop filter 60 connected to the output of the phase detector 58 and the VCO 40. One input of the phase detector 58 receives the previously recorded (incoming) pilot signal from the heads 8 through a pilot signal filter 64. The pilot filter 64 operates in a manner well known to those skilled in the art to separate the incoming pilot signal from the rest of the video signal and to discriminate against impulse noise. The other input of the phase detector 58 receives a local pilot signal. The phase detector 58 generates a voltage proportional to the phase difference between the incoming and local pilot signals. This voltage is applied through the loop filter 60 to the input of the VCO 40 so as to correct any timing differences up to a maximum amount equal to the period of the pilot signal $1/f_p$. The maximum timing difference, $1/f_p$, which the fine timing control loop 18 can sense will be exceeded from time to time by larger timing errors such as skew errors due to improper tape tension (as discussed previously herein). Such larger errors are handled in the coarse timing control loop 16 shown in FIG. 4.

Coarse Timing Control Loop

The coarse timing control loop 16 senses timing differences between the previously recorded (incoming) horizontal sync pulses $H_{sync}$ received from the heads 8 and the locally generated horizontal sync pulses $H'_{sync}$ and changes the modulus of the divide counter 42 so as to minimize or correct such timing differences.

In the coarse timing control loop 16 shown in FIG. 4, a sync pulse comparator 66 has one of its inputs connected to receive the local $H'_{sync}$ pulses and its other input connected to receive the incoming $H_{sync}$ pulses through a sync pulse filter 70. The sync pulse filter 70 filters out impulse noise in the well-known manner. The sync pulse comparator 66 has two outputs, 66a, 66b generating an up/down logic signal and an enable logic signal, respectively. These two logic signals are applied to the control inputs of a sync counter 72, whose output is applied through a two-pole switch 74 to the divide counter 42. For purposes of the present discussion, it will be assumed that the two-pole switch 74 constantly connects the sync counter 72 to the divide counter 42.

The contents M−N of the sync counter 72 establish the modulus N of the divide counter 42 corresponding to a zero timing difference between $H_{sync}$ and $H'_{sync}$ pulses. The divide counter 42 counts output pulses from the VCO 40, from M−N to M and resets to M−N each time it reaches M. In response, the timing logic 44 produces all of the required system pulses including the local pilot signal and $H'_{sync}$ pulses, as mentioned previously.

If the sync pulse comparator 66 determines no difference in timing between an incoming sync pulse $H_{sync}$ and its corresponding local sync pulse $H'_{sync}$, then the enable comparator output 66b is low. The contents of the sync counter 72 therefore remain constant, as does the divide counter modulus N.

If the sync pulse comparator 66 senses that a local sync pulse $H'_{sync}$ is late with respect to its corresponding incoming sync pulse $H_{sync}$, then the enable output 66b is high and the up/down output 66a is also high. In response, the sync counter 72 is incremented to M−N+1. so that the divide counter modulus is decremented to N−1. This causes the divide counter 42 to count "faster" by one VCO pulse each horizontal line. The divide counter 42 continues to count at this "faster" rate unless or until the timing of the H'$_{sync}$ pulse timing catches up to the H$_{sync}$ pulse timing and the error is removed.

On the other hand, if the H'$_{sync}$ pulse were early, then the enable output 66b would again be high, but the up/down output 66a would be low, and the sync counter 72 would be decremented to M−N−1 to increment the divide counter modulus to N+1. The foregoing may be summarized in the following table:

TABLE I

| H'$_{sync}$ Pulse: | Early | Late |
|---|---|---|
| Up/Down: | Low | High |
| Sync Counter: | M − N − 1 | M − N + 1 |
| Count Modulus: | N + 1 | N − 1 |

Fine and Coarse Control Loop Operation

Figure 5:
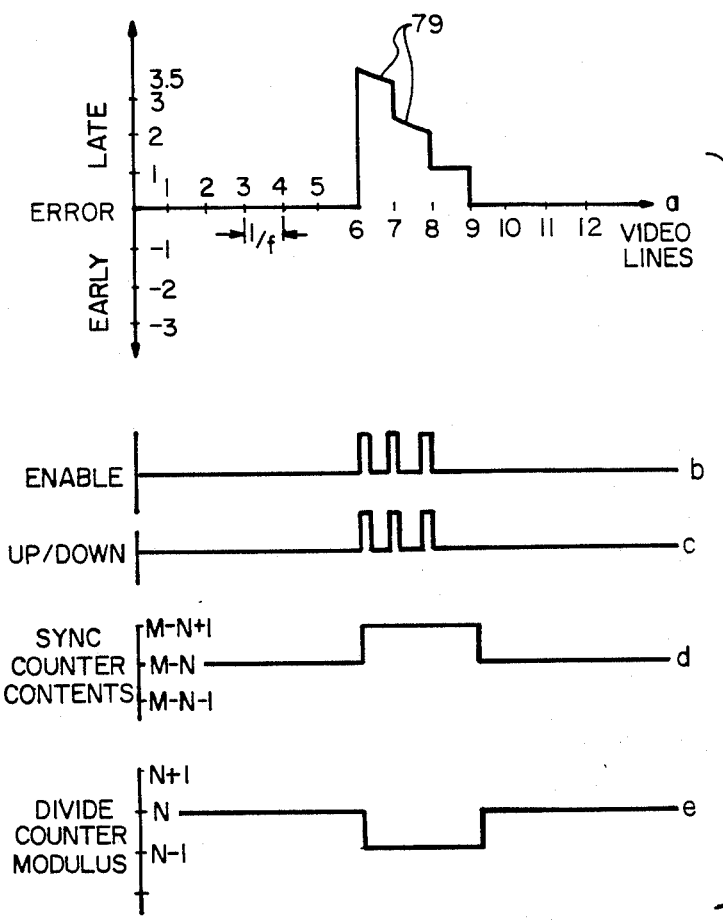
FIG. 5 includes a set of contemporaneous timing diagrams in an illustrative example of the timing of the sync counter loop of FIG. 4.

The foregoing operation is best understood by reference to the exemplary timing diagram of FIG. 5a whose vertical axis represents the the H'$_{sync}$ timing error (with respect to the H$_{sync}$ pulse) in units of VCO counts, $1/f_{VCO}$, while its horizontal axis represents time in units of horizontal video line scan periods. For the sake of simplicity, it will be assumed $f_p = f_{VCO}$. In the arbitrary example of FIG. 5a, the H$_{sync}$ error is 3.5 VCO pulses (counts) at the beginning of video line 6.

In the fine control loop 18, the phase detector 58 senses a phase error during video line 6 and immediately raises the voltage applied to the VCO 40 to increase the frequency $f_{VCO}$ slightly. This slightly reduces the error, as can be seen by the exponential decay curve 79 in FIG. 5a. The shape of the curve 79 is determined by the loop filter 60. (Preferably, the loop filter 60 stabilizes control loop operation in accordance with principles well-known in the art so that complete correction of a phase error corresponding to one pilot pulse period $1/f_p$ requires on the order of two horizontal line scan periods.)

In the coarse control loop 16, the sync pulse comparator 66 detects a late H'$_{sync}$ pulse at the beginning of video line 6 and generates high enable and up/down logic signals as illustrated in FIGS. 5b and c, respectively. This causes the contents of the sync counter 72 to be incremented to M−N+1, decreasing the divide counter modulus to N−1, as illustrated in FIGS. 5d and 5e. Accordingly, the divide counter 42 begins counting by the decremented modulus N−1 at the beginning of video line 6, as illustrated in FIG. 5e. Therefore, the H'$_{sync}$ error is reduced by one VCO count by the beginning of horizontal video line 7, as illustrated in FIG. 5a. However, an error of about two VCO counts still remains and so the enable and up/down logic signals are again high in video line 7, thus maintaining the divide counter modulus at its decremented value N−1 through video line 7. At the beginning of video line 8, the H'$_{sync}$ error has been reduced by yet one more VCO count. The process is repeated through video line 8 to remove the remaining error (of one VCO count) by the beginning of video line 9.

The sensitivity of the sync pulse comparator 66 is limited so that it cannot detect H$_{sync}$ errors less than the pilot pulse period $1/f_p$ (less than one VCO count $1/f_{VCO}$ in this example), leaving the fine timing control loop 18 to handle these. Therefore, at the beginning of video line 9, the sync pulse comparator 66 detects zero H$_{sync}$ error so that the enable comparator output 66b returns to a low state. (The state of the up/down comparator output 66a has no effect on the sync counter 72 once the enable comparator output 66b is low.) In response to the low enable signal occurring in video line 9, the sync counter contents returns to its initial value M−N as illustrated in FIG. 5d, and the divide counter modulus returns to N as illustrated in FIG. 5e.

The coarse timing control loop 16, while having a greater range than the fine timing control loop 18, is itself limited to a range of time base errors averaging just a few VCO counts (in this particular example) over one video field (such as random time base errors, which generally average out to zero ±1 VCO count over each video field). The coarse timing control loop 16 is too slow to handle the sudden and large timing errors (such as skew jump errors).

Look-Ahead Control Loop

Generally the greatest time base error occurs at the end of each video field and is due to the accumulation of a steadily growing net error which finally manifests itself abruptly just at the end of each track on the video tape as the heads are switched and recording resumes on the next track. Such "skew jump" errors are large enough to create image distortion such as "flag waving" in the playback video image at the beginning of each video field which persists over many lines and seriously distorts the timing of the TDM processor 54. This type of error generally is repeated every head switch and is slowly varying due to the inertia of the head and drum assembly (as mentioned previously herein). A skew jump error can be as large as half a horizontal line in either time direction and the coarse timing control loop 16 may take more than fifteen horizontal line periods to correct the error.

In order to prevent such skew jump errors, a third "look-ahead" control loop having a larger error control range operates during a preliminary video line period of each field (preferably, prior to the active portion of the video signal). Referring to FIG. 4, the third control loop comprises a jump set flip-flop 82, the sync pulse comparator 66 and a jump counter 80 connected through the two-pole switch 74 to the divide counter 42. The set input of the jump set flip-flop 82 receives a "head switch pulse" generated by the signal processor 52 whenever the two heads are switched at the beginning of each track. The reset input of the jump set flip-flop 82 is connected through a suitable delay line 84 to receive a pulse generated by the timing logic 44 whenever the count of the divide counter 42 reaches its maximum count M.

The output of the jump set flip-flop 82 controls the state of the two-pole switch 74 as follows: With the occurrence of each head switch pulse, the two-pole switch 74 disconnects the divide counter 42 from the sync counter 72 and connects it instead to the jump counter 80 just during a preliminary horizontal video line period—or, alternatively, during the first active video line of each video field. (Typically, the first several horizontal sync pulses following each head switch pulse precede the active video signal.) At the end of this video line period, the flip-flop 82 receives the end of count pulse from the timing logic 44 and returns the switch 74 to its original state. The modulus of the divide counter 42 is thus under control of the jump counter 80 rather than the sync counter 72, just during a preliminary horizontal video line period of each field. The jump counter 80 stores the total net time base error accumulated during the previous video field and abruptly enters this correction into the divide counter 42 at the beginning the present field, thus anticipating the repetitive skew jump error.

The net error is accumulated and stored in the jump counter 80 as follows: Prior to operation, the contents of the sync counter 72 and of the jump counter 80 are set to M−N, where M=maximum count of the divide counter 42 (255 for an 8-bit counter) and N=the initial modulus of the divide counter 42 corresponding to a zero timing difference between $H_{sync}$ and $H'_{sync}$ pulses. During each video line in which a time base error exceeding $1/f_{VCO}$ occurs, the sync counter contents M−N is either incremented to M−N+1 or decremented M−N−1, in response to the "enable" and "up/down" logic signals, as described previously. Simultaneously, during that video line, the jump counter 80 counts up or down by one, respectively. Thus, during each video field, the jump counter 80 adds or subtracts from M−N the number of times the sync counter 72 has been set to its incremented value (M−N+1) or decremented value (M−N−1), respectively, to arrive at a number M−N+J. J represents the net error accumulated at the end of each field in units of VCO counts, and may be either positive or negative. In instances where the sync counter 72 is set, for example, to its incremented value during many horizontal video lines, J may reach a very high positive number.

The jump counter 80 preferably comprises an 8-bit up/down counter with the ability to count up or down from M−N to as low as 0 and as high as M (255). Of course, for an 8-bit counter, the jump counter 80 will have its greatest range if M−N is selected to be exactly half-way between 0 and 255. Thus, the jump counter 80 can store a relatively large skew jump error correction J to be entered into the divide counter 42 automatically at the beginning of each field. Accordingly, skew jump error of even a very large magnitude is precisely tracked during each video field so that at the beginning of the next field it may be completely anticipated and automatically removed to avoid image distortion, a significant advantage.

Before describing the timing and simultaneous operation of all three playback control loops of the three-tiered control loop of the invention (i.e., the fine timing control loop, the coarse timing control loop and the look-ahead control loop), the preferred detailed logic design shall first be described

Detailed Logic Design

One of skill in the art may readily implement the foregoing system from the description already given. However, for completeness, the presently preferred logic design of the invention is now described.

Divide Counter

Figure 6:
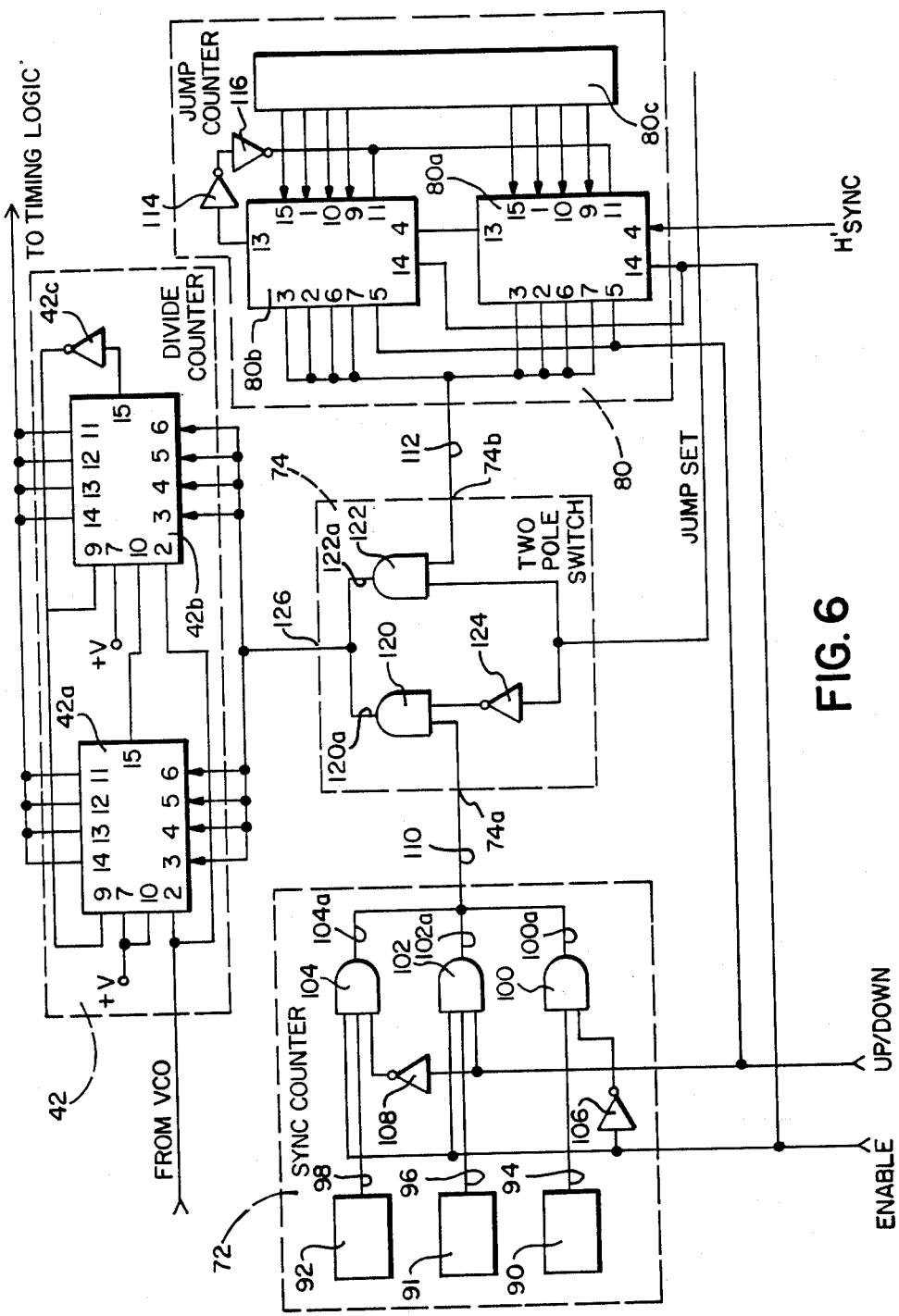
FIG. 6 is a simplified schematic diagram of the preferred embodiment of the divide counter, sync counter, jump counter, and two-pole switch of FIG. 4.

Referring to FIG. 6, the divide counter 42 comprises two integrated circuits 42a and 42b, each being a synchronous 4-bit counter, part number SN 74160, available from Texas Instruments Inc., P.O. Box 225214, Dallas, Tex., 75265. The pin numbers shown in FIG. 6 correspond to those given in the *TTL Data Book for Design Engineers*, 2nd Edition, 1981, page 7-190, published by Texas Instruments Inc. Pins 3, 4, 5, 6, of counter 42a correspond to the four least significant input bits of the divide counter 42, and are connected to the output of the two-pole switch 74. Pins 3, 4, 5, 6 of counter 42b correspond to the four most significant input bits of the divide counter 42 and are also connected to the output of the two-pole switch 74. Pins 14, 13, 12, and 11 of counter 42a correspond to the least significant output bits of the divide counter 42 while pins 14, 13, 12, and 11 of counter 42b comprise the most significant output bits. Pin 2 of counter 42a and pin 2 of counter 42b are both connected to the output of the VCO 40.

Sync Counter

Figure 7:
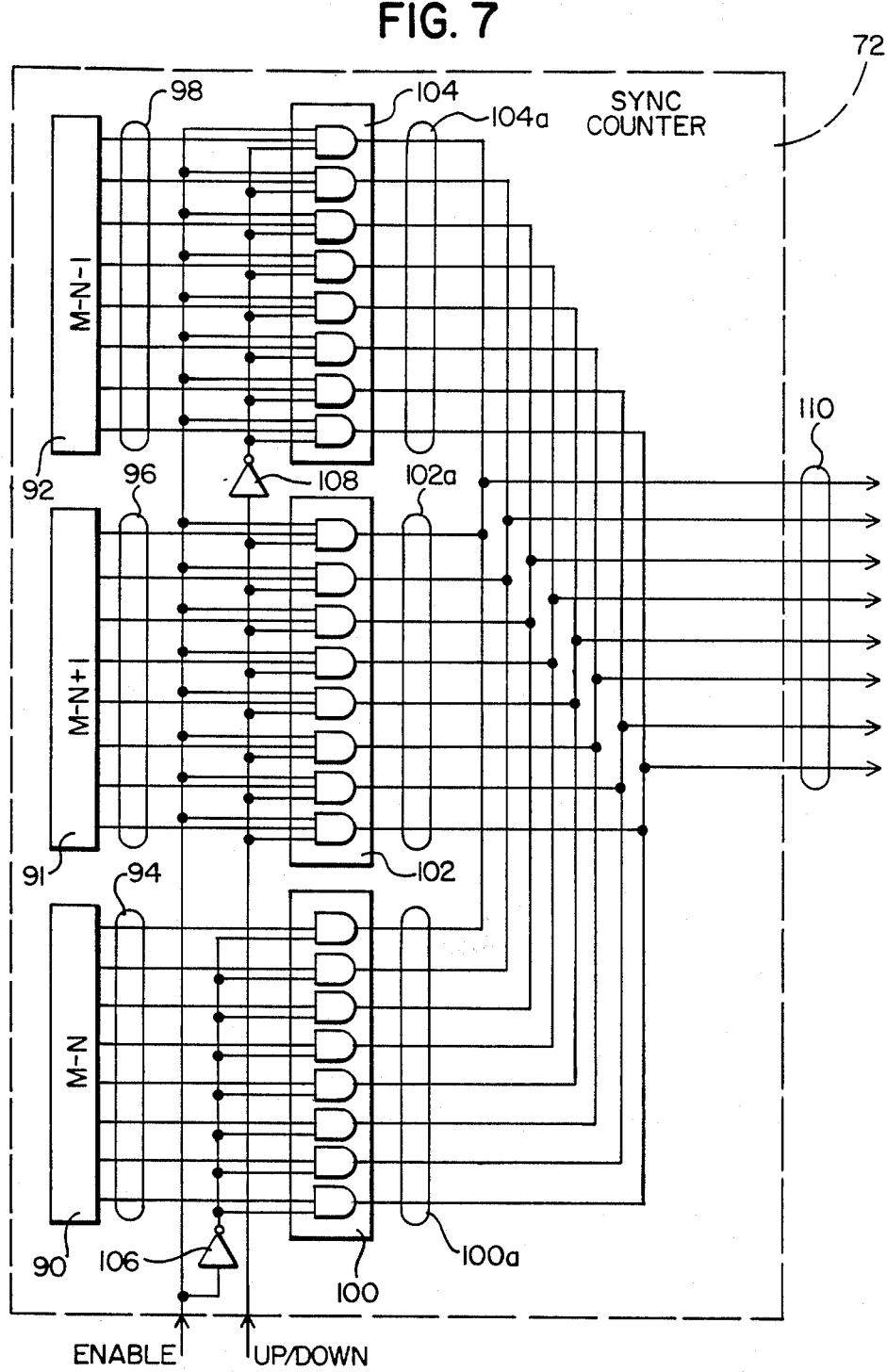
FIG. 7 is a simplified logic diagram of the preferred embodiment of the sync counter of FIG. 4.

Referring to FIGS. 6 and 7, the sync counter 72 includes three 8-bit switches 90, 91, 92, each having 8 output bits individually set to high or low logic states. The switch 90 is set to M−N, the switch 91 is set to M−N+1 and the switch 92 is set to M−N−1. Three 8-bit buses 94, 96, and 98 connect the three switches respectively to three sets of 8-bit AND gates 100, 102, 104, whose 8-bit outputs 100a, 102a, 104a are combined in an 8-bit bus 110. The enable signal is applied to the AND gates 102, 104 and, through an inverter 106, to the AND gate 100. The "up/down" logic signal is applied to the AND gate 102 and, through an inverter 108, to the AND gate 104.

Jump Counter

Referring to FIG. 6, the jump counter 80 includes two up/down counter integrated circuits 80a, 80b, both of which are part number SN 74190 described at page 7-296 of the above-referenced *TTL Data Book For Design Engineers*. The pin numbers used in this description correspond to those employed in that reference. The jump counter 80 also includes an 8-bit switch 80c which is initially set to the 8-bit number M−N. The four least significant bits of the switch 80c are connected individually to pins 9, 10, 1 and 15 of the counter 80a while the four most significant bits of the switch 80c are connected to pins 9, 10, 1 and 15 of the up/down counter 80b. Pins 7, 6, 2, 3 of the counter 80a comprise the four least significant output bits of the jump counter 80 while pins 7, 6, 2, 3 of the counter 80b comprise the four most significant output bits, all of which are connected through an 8-bit output bus 112 to an iput 74b of the two-pole switch 74. Pin 5 of counter 80a and pin 5 of counter 80b receive the "up/down" logic signal, while pin 14 of counter 80a and pin 14 of counter 80b receive the "enable" logic signal. Pin 4 of counter 80a receives the local horizontal sync pulse $H'_{sync}$.

Two-Pole Switch

Figure 8:
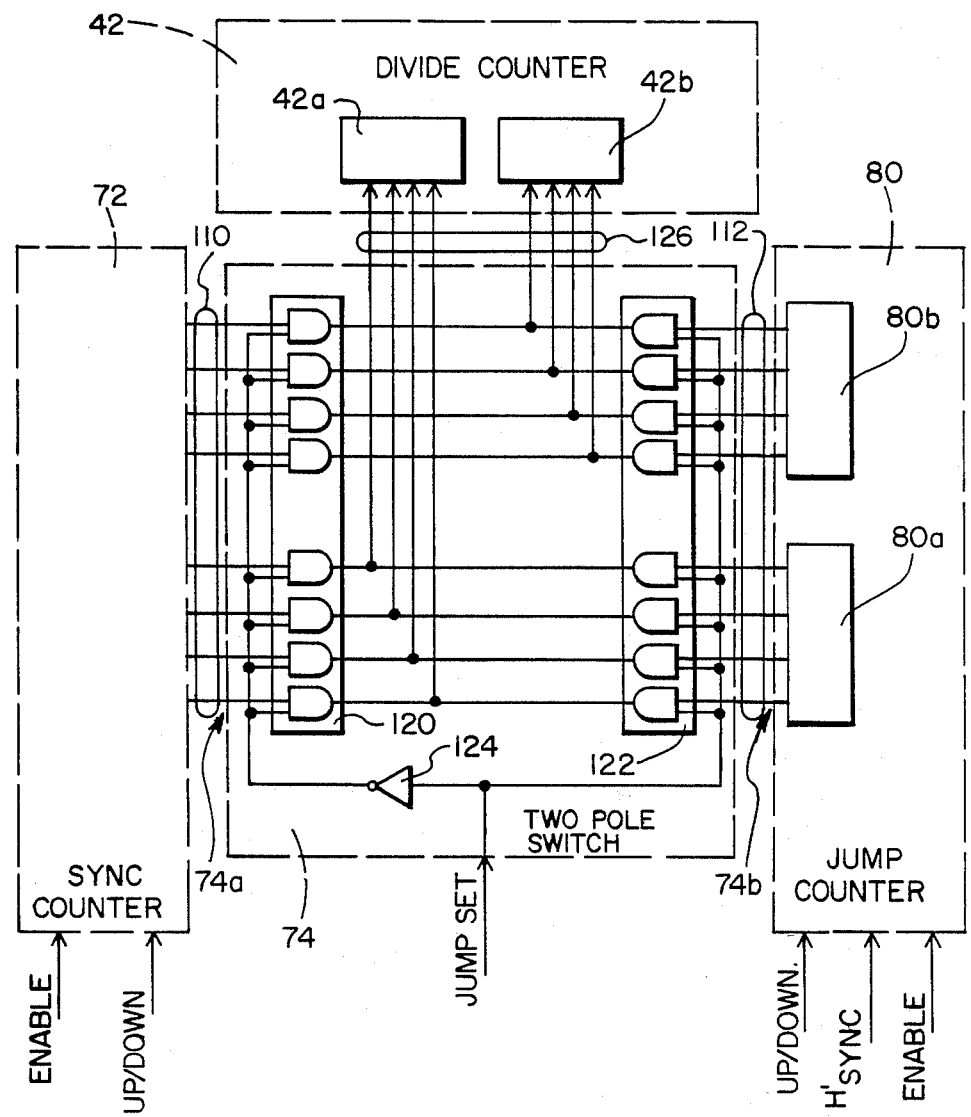
FIG. 8 is a simplified logic diagram of the preferred embodiment of the two-pole switch of FIG. 4.

Referring to FIGS. 6 and 8, the two-pole switch 74 includes two 8-bit AND gates 120 and 122. Each of the 8-bits from the bus 110 are individually ANDed by the AND gate 120 with the inverse of the jump set logic signal received through an inverter 124. Each of the eight bits from the bus 112 are individually ANDed with the jump set signal by AND gate 122. The 8-bit AND gate outputs 120a and 122a are connected through 8-bit bus 126 to the 8-bit input of the divide counter 42.

Sync Pulse Comparator

Figure 9:
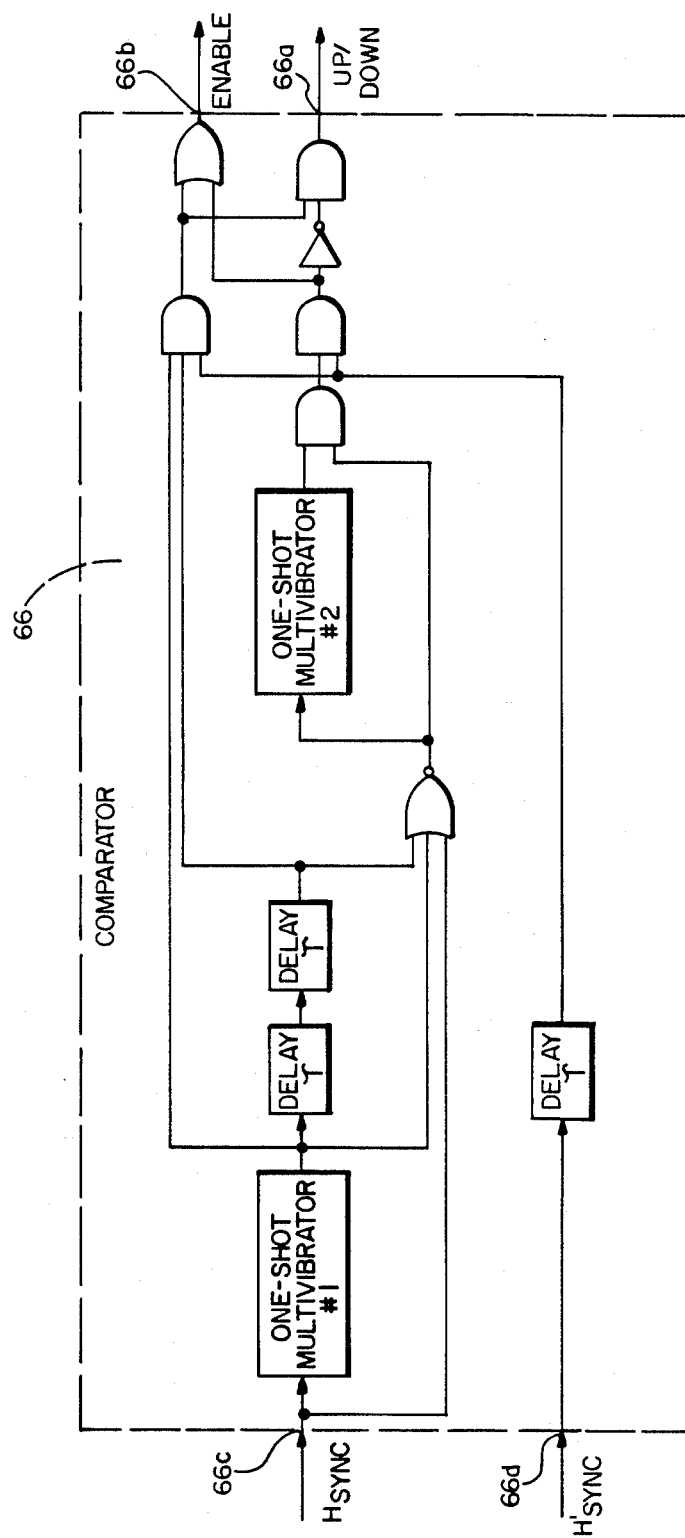
FIG. 9 is a simplified logic diagram of the preferred embodiment of the sync pulse comparator of FIG. 4.

The sync pulse comparator 66 is illustrated in FIG. 9. The sync pulse signals $H_{sync}$ and $H'_{sync}$ are applied to inputs 66c, 66d, respectively, of the comparator 66. The up/down and enable signals are generated at the outputs 66a, 66b, respectively, of the comparator 66. Each Delay τ depicted in FIG. 9 is selected so as to limit the sensitivity of the comparator 66 and to correspondingly limit the duty cycle of the jump counter 80. Preferably, each Delay $\tau$ is on the order of one VCO count, $1/f_{VCO}$. The pulse width of One Shot Multivibrator #1 and of One Shot Multivibrator #2 is preferably about ($\frac{1}{2}$) M ($1/f_{VCO}$). The delay of One Shot #2 is preferably the period of the $H'_{sync}$ pulse minus twice the pulse width of One Shot #1. This arrangement helps prevent the comparator 66 from exceeding the range of the jump counter 80.

Combined Operation and Timing of the Coarse Timing Control Loop, The Fine Timing Control Loop and The Look-Ahead Control Loop Operation of the playback system of FIG. 4 may be understood by reference to the contemporaneous timing diagrams of FIG. 10. The horizontal axis of FIG. 10 represents time in units of horizontal video line scan periods. FIG. 10 illustrates an arbitrary example in which a skew jump error of 3.5 VCO counts occurs at the beginning of the active portion of each new video field (i.e., after the head switch pulse). In the arbitrary example of FIG. 10, the local $H'_{sync}$ pulse is produced by the timing logic 44 each time the counter 42 reaches its maximum count M, so that the end of count coincides with the end of each horizontal line scan period. (The delay line 84 accordingly is characterized by a delay of much less than a line scan period.) The maximum count M of the divide counter 42 is 255. The sync counter 72 and the jump counter 80 are both initialized at M−N, to establish the initial divide counter modulus of N. Referring to FIG. 10a, at time $T_0$ no time base error is present.

The signal processing circuits 52 generate the head switch pulse illustrated in FIG. 10h at time $T_0$, causing the "jump set" output of the flip-flop 82 to go high, as illustrated in FIG. 10e. In response, the two-pole switch 74 disconnects the input of the divide counter 42 from the sync counter 72 and connects it instead to the output of the jump counter 80. The divide counter 42 begins counting from M−N, the initial contents of the jump counter 80. After the divide counter 42 reaches its maximum count M, the switch 74 returns control of the divide counter 42 to the sync counter 72. The divide counter modulus is therefore under the control of the jump counter 80 for one horizontal line period ($T_0$ to $T_1$) just prior to the first active horizontal line of the present video field.

At time $T_1$, control of the divide counter 42 reverts to the sync counter 72. A time base error 3.5 VCO counts is now sensed. The comparator 66 immediately senses that the local sync pulse $H'_{sync}$ is late by three VCO counts with respect to the incoming $H_{sync}$ pulse. Therefore, at time $T_1$, the "enable" and "up/down" logic signals from the comparator 66 become high, as illustrated in FIGS. 10b and 10c. The high "up/down" and "enable" logic signals are applied to the sync counter 72 and to the jump counter 80 so that both the sync counter 72 and the jump counter 80 are incremented to M−N+1 (FIGS. 10d and 10f, respectively).

Therefore, at time $T_1$ the divide counter 42 begins counting by the decremented modulus N−1 so that the next local $H'_{sync}$ at time $T_2$ pulse occurs one VCO count early, thus reducing the $H'_{sync}$ error by one VCO count at time $T_2$, as shown in FIG. 10a.

As illustrated in FIG. 10a, from time $T_1$ to $T_2$, the $H_{sync}$ error has been reduced gradually from 3.5 VCO counts to approximately 3.3 VCO counts by the corrective action of the fine timing control loop 18.

The $H'_{sync}$ pulse occurring at time $T_2$ is late and therefore the "enable" and "up/down" logic signals are again high at time $T_2$, as illustrated in FIGS. 10b and 10c. This keeps the sync counter 72 incremented at N−M+1 (FIG. 10d) and causes the jump counter 80 to increment itself further, this time from N−M+1 to N−M+2 (FIG. 10f). The divide counter 42 again counts, under the control of the sync counter 72, by the decremented modulus N−1. This causes the next local $H'_{sync}$ pulse occurring at time $T_3$ to occur one VCO count earlier, thus decreasing the $H'_{sync}$ error again by one VCO count at time $T_3$, as illustrated in FIG. 10a. Thus, at time $T_3$, the remaining $H'_{sync}$ error stands at one VCO count. In the meantime, the fine timing control loop 18 continues its gradual corrective action from time $T_2$ to time $T_3$ to remove the remaining fractional-count error, as illustrated in FIG. 10a.

At time $T_3$, the next horizontal sync pulse $H'_{sync}$ is late by one VCO count, thus causing the "up/down" and "enable" logic signals to again be high. This causes the jump counter 80 to again increment itself, this time to M−N+3, as illustrated in FIG. 10f.

The divide counter 42 counts by the decremented modulus N−1 from time $T_3$ to $T_4$, under control of the sync counter 72, so that the remaining $H'_{sync}$ error is reduced (by one VCO count) to zero. At time $T_4$, the comparator 66 senses zero error and returns the enable logic signal to its original low state. While this causes the sync counter 72 to return to its original M−N state, the jump counter 80 remains at its incremented count M−N+3, in readiness for the beginning of the next video field.

The remaining video lines in the present field, beginning at time $T_5$, are free of error as illustrated in FIG. 10a. The 3.5 count skew jump error repeats at time $T_{262.5}$ near the beginning of the active portion of the next video field. Just prior to this, however, at time $T_V$, the corresponding head switch pulse and the jump set signal occur as illustrated in FIGS. 10h and 10e, respectively, causing the two-pole switch 74 to disconnect the divide counter 42 from the sync counter 72 and connect it instead to the jump counter 80 for one horizontal line scan period. Thus, at time $T_V$, the divide counter 42 begins counting by the decremented modulus N−3, corresponding to the net error accumulated in the jump counter 80. As a result, all but 0.5 VCO count of the skew jump error have been, in effect, anticipated by the jump counter 80 by time $T_{262.5}$. The residual 0.5 VCO count error is corrected within the next one or two horizontal video lines by the fine timing control loop 18. This process is again repeated at time $T_{565}$ at the beginning of the third video field of FIG. 10. Thus, the repetitive skew jump error is anticipated and removed at the beginning of each field before it can cause degradation of the video image.

In summary, the fine timing control loop 18 and the coarse timing control loop 16 handle the small and medium time base errors occurring during each video field while the look-ahead control loop 66, 80, 42 anticipates the very large skew jump errors occurring at the beginning of each video field. The jump counter 80 can store a very large correction to the divide counter modulus, imposing it at the beginning of each video field to anticipate and provide instantaneous skew jump compensation. Moreover, the fine control loop continues to receive at least some recorded pilot pulses during each horizontal video line scan period even while the coarse control loop operation is temporarily interrupted due to the loss of the corresponding recorded $H_{sync}$ pulse. Thus, the timing recovery system of the invention not only automatically compensates for skew jump errors, but is virtually impervious to noise or drop-outs in the incoming or playback video signal, a remarkable achievement.

The invention has been described in detail with particular reference to preferred embodiments thereof, but it will be understood that variations and modifications can be effected within the spirit and scope of the invention.

What is claimed is:

1. In a video playback system for reproducing a video signal previously recorded in successive tracks on a storage medium together with a superimposed pilot pulse signal and a video synchronization pulse signal characterized by a synchronization pulse period, a timing recovery system, comprising:
    means for generating a playback synchronization pulse signal similar to said recorded synchronization pulse signal and a playback pilot signal similar to said recorded pilot signal and which is in synchronism with said playback synchronization pulse signal;
    means for sensing timing differences between (a) said recorded and playback pilot pulse signals and (b) said recorded and playback synchronization pulse signals;
    timing control means, responsive to said sensing means, for controlling said generating means by changing the timing of said playback pilot signal and of said playback synchronization signal so as to compensate for said timing differences, wherein the frequency of each of said pilot signals is greater than the frequency of each of said synchronization signals whereby said timing control means senses at least said pilot pulse signal timing difference during at least a portion of said synchronization pulse period even in an absence of said video synchronization pulse signal.

2. The video playback system of claim 1 further comprising a look-ahead timing control loop, said look-ahead timing control loop comprising:
    means for accumulating and storing a net change in said playback synchronization signal timing made by said timing control means; and
    means for altering said playback synchronization signal timing at the beginning of each one of said successive tracks by said net change stored in said accumulating means.

3. The video playback system of claim 1 wherein said timing control means includes a fine timing control loop responsive to said pilot pulse signal timing difference, said fine timing control loop comprising:
    means for generating a clock signal;
    means connected to said clock generating means and to said pilot and synchronization signal generating means for establishing a frequency ratio between the frequencies of said clock signal and of said playback synchronization signal; and
    means for changing said clock frequency so as to compensate those of said pilot pulse signal timing differences which are less than the period of said playback pilot pulse signal.

4. The video playback system of claim 3 wherein said timing control means further includes a coarse timing control loop responsive to said synchronization pulse signal timing difference, said coarse control loop comprising:
    means for increasing or decreasing said frequency ratio by a predetermined amount for a predetermined period of time in response to said sensing means so as to compensate those of said synchronization pulse signal timing differences which are greater than the period of said playback pilot pulse signal.

5. The video playback system of claim 4 further comprising a look-ahead timing control loop, said look-ahead timing control loop comprising:
    means for accumulating and storing the net number J of positive and negative changes made by said increasing and decreasing means to said frequency ratio;
    means responsive to said accumulating means for temporarily changing said frequency ratio by an amount corresponding to said net number J, so as to compensate those of said synchronization pulse signal timing differences exceeding plural periods of said playback pilot pulse signal.

6. The video playback system of claim 5 wherein said look-ahead loop frequency ratio changing means is periodically operable at the beginning of each one of said successive tracks for a temporary duration.

7. The video playback system of claim 6 wherein said temporary duration generally corresponds to said synchronization pulse period and precedes the active portion of the video signal recorded on said one track, whereby said look-ahead control loop generally compensates said exceeding timing differences before playback of the active portion of the video signal on said track.

8. The video playback system of claim 1, 2, 3, 4, 5, 6 or 7 further comprising means for substituting said playback synchronization pulse signal, instead of said recorded synchronization pulse signal, whereby playback timing of said video signal is unaffected by a temporary loss of said recorded synchronization signal.

9. The video playback system of claim 1 further comprising:
    means for generating a clock signal;
    means connected to said clock generating means and to said pilot and synchronization signal generating means for establishing a frequency ratio between the frequencies of said clock signal and at least one of said playback synchronization and pilot signals; and
    means for increasing or decreasing said frequency ratio by a predetermined amount for a predetermined period of time in response to said sensing means so as to compensate those of said timing differences sensed by said sensing means.

10. The video playback system of claim 9 wherein:
    said accumulating means counts the net number J of positive and negative changes made by said increasing and decreasing means to said frequency ratio;
    said altering means temporarily changes said frequency ratio by an amount corresponding to said net number J, so as to compensate those of said timing differences sensed by said sensing means.

11. In a video playback system for reproducing a carrier-modulated video signal of carrier frequency $f_c$ previously recorded on successive tracks on a storage medium with a synchronization signal and a pilot signal, a timing recovery system, comprising:

means for supplying a clock signal of frequency $f_{VCO}$;

means for generating, in synchronism with said clock signal, a playback synchronization signal of frequency $f_H$ and a playback pilot signal of frequency $f_p$, wherein $f_{VCO}/f_H$ is a selected frequency ratio N and wherein $f_p$ is greater than $f_H$ and less than $f_c$;

means for sensing phase differences between said recorded pilot signal and said playback pilot signal and for altering said clock frequency $f_{VCO}$ so as to reduce said phase differences;

comparator means for sensing timing differences between said playback synchronization signal and said recorded synchronization signal; and means connected to said generating means and responsive to said comparator means for changing said frequency ratio by a predetermined amount for a predetermined time-interval so as to reduce said synchronization signal timing differences.

12. The video playback system of claim 11 wherein said changing means increments said frequency ratio to N+1 or decrements it to N−1 whenever said playback synchronization signal is early or late, respectively, with respect to said recorded synchronization signal.

13. The video playback system of claim 11 further comprising:

means for accumulating the changes to said frequency ratio made by said changing means and for storing a net cumulative change derived therefrom; and means connected to said accumulating means for adding, to said frequency ratio, a number corresponding to said net cumulative change for a temporary duration of time.

14. The video playback system of claim 13 wherein said temporary duration occurs at the beginning of each of said successive tracks.

15. The video playback system of claim 11 wherein said comparator means detects timing differences no smaller than $\tau$, wherein $\tau$ is proportional to $1/f_p$, so as to limit the duty cycle of said changing means.

16. The video playback system of claim 14 further comprising a two-pole switch operable to peridically disconnect said generating means from said changing means and to connect said generating means instead to said accumulating means for said temporary duration.

17. The video playback system of claim 13 wherein said accumulating means counts up by said predetermined amount whenever said changing means increments said frequency ratio, and counts down by said predetermined amount whenever said changing means decrements said frequency ratio, and wherein said temporary duration and said predetermined time interval correspond to a horizontal line scan period, $1/f_H$, whereby said accumulating means precisely follows the changes in said frequency ratio made by said changing means.

18. The video playback system of claim 11 or 13, further comprising:

means for receiving an incoming video signal which is to be recorded, said incoming video signal being characterized by said FM carrier frequency $f_c$ and being accomplished by an incoming synchronization signal;

means for sensing phase differences between said playback synchronization signal and said incoming synchronization signal, and for changing said clock frequency $f_{VCO}$ so as to reduce said phase differences; and means for mixing said video signal with said generated pilot signal and recording them together in said successive tracks.

19. In a video playback system for playing back a video signal previously recorded in successive tracks on a storage medium together with a superimposed pilot pulse signal and a video synchronization pulse signal, a timing recovery system comprising:

means for generating a playback synchronization pulse signal generally similar to said video synchronization pulse signal and a playback pilot signal generally similar to said recorded pilot signal and which is in synchronism with said playback synchronization pulse signal;

means for sensing timing differences between said recorded and playback pilot pulse signals and between said video and playback synchronization pulse signals;

timing control means, responsive to said sensing means, for controlling said generating means by changing the timing of said playback pilot signal and of said playback synchronization signal so as to reduce said timing differences, wherein the frequency of each of said pilot signals is greater than the frequency of each of said synchronization signals; and means for substituting said playback synchronization pulse signal instead of said video synchronization pulse signal, whereby said playback synchronization pulse signal provides reliable timing synchronization during playback of said video signal.

20. The video playback system of claim 19 further comprising a look-ahead timing control loop, said look-ahead timing control loop comprising:

means for accumulating and storing a net change in said playback synchronization signal timing made by said timing control means; and means for altering said playback synchronization signal timing at the beginning of each one of said successive tracks by said net change stored in said accumulating means.

21. The video playback system of claim 19 wherein said timing control means includes a fine timing control loop comprising:

means for generating a clock signal;

means connected to said clock generating means and to said pilot and synchronization signal generating means for establishing a frequency ratio between the frequencies of said clock signal and of said playback synchronization signal; and means for changing said clock frequency so as to reduce said timing differences.

22. The video playback system of claim 21 wherein said timing control means further includes a coarse control loop comprising:

means for increasing or decreasing said frequency ratio by a predetermined amount for a predetermined period of time in response to said sensing means so as to reduce said timing differences.

23. The video playback system of claim 22 further comprising a look-ahead timing control loop, said look-ahead timing control loop comprising:

means for accumulating and storing the net number J of changes made by said increasing and decreasing means to said frequency ratio;

means responsive to said accumulating means for temporarily changing said frequency ratio by an amount corresponding to said net number J, so as to reduce said timing differences.

24. The video playback system of claim 23 wherein said look-ahead loop frequency ratio changing means is periodically operable at the beginning of each one of said successive tracks for a temporary duration.

25. The video playback system of claim 24 wherein said temporary duration generally corresponds to the period of said playback synchronization pulse signal and precedes the active portion of the video signal recorded on said one track, whereby said look-ahead control loop generally reduces said timing differences before the active portion of the video signal on said one track.

26. The video playback system of claim 17, 18, 19, 20, 21, 22 or 23 wherein said previously recorded video signal generally occupies a certain frequency band, and wherein said recorded and playback pilot pulse signals are characterized by at least nearly equal pilot pulse frequencies which lie below at least one FM sideband of said video signal, whereby said pilot pulse signals are generally free of interference with said video signal and are generally free of high frequency magnetic recording losses.

27. The video playback system of claim 21, 22, 23, 24 or 25 further comprising:
means for receiving an incoming video signal which is to be recorded, said incoming video signal being accompanied by an incoming synchronization pulse signal;
means for sensing a phase difference between said playback synchronization signal and said incoming synchronization signal, and for changing said frequency of said clock signal so as to compensate said phase difference; and
means for combining said video signal with said playback pilot signal and with said playback synchronization signal and recording them together in said successive tracks.

28. In a video playback system for reproducing a video signal previously recorded in successive tracks on a storage medium together with at least one of (a) a superimposed pilot pulse signal and (b) a video synchronization pulse signal characterized by a synchronization pulse period, a timing recovery system, comprising:
means for generating at least one of (a) a playback synchronization pulse signal similar to said recorded synchronization pulse signal and (b) a playback pilot signal similar to said recorded pilot signal and which is in synchronism with said playback synchronization with said playback synchronization pulse signal;
means for sensing timing differences between at least one of (a) said recorded and playback pilot pulse signals and (b) said recorded and playback synchronization pulse signals;
means for accumulating at least some of said timing differences sensed by said sensing means and storing a net timing difference derived from said accumulated timing difference; and
means for periodically altering the timing of at least one of said playback synchronization signal and said playback pilot signal by said net timing difference stored in said accumulating means.

29. The video playback system of claim 28 wherein said altering means is periodically operable at the beginning of each one of said successive tracks for a temporary duration.

30. The video playback system of claim 29 wherein said temporary duration generally corresponds to said synchronization pulse period and precedes the active portion of the video signal recorded on said one track, whereby said accumulating and altering means generally compensates said sensed timing differences before playback of the active portion of the video signal on said track.

31. The video playback system of claim 28, 9, 10, 29, or 30 further comprising means for substituting said playback synchronization pulse signal to accompany said video signal, instead of said recorded synchronization pulse signal.

32. In a video playback system for playing back a video signal previously recorded in successive tracks on a storage medium together with at least one of (a) a superimposed pilot pulse signal and (b) a video synchronization pulse signal, a timing recovery system comprising:
means for generating a playback synchronization pulse signal generally similar to said video synchronization pulse signal and a playback pilot signal generally similar to said recorded pilot signal and which is in synchronism with said playback synchronization pulse signal;
means for sensing timing differences between at least one of: (a) said recorded and playback pilot pulse signals and (b) said video and playback synchronization pulse signals;
means for substituting said playback synchronization pulse signal to accompany said video signal, instead of said video synchronization pulse signal, whereby said playback synchronization pulse signal provides reliable timing synchronization during playback of said video signal;
means for accumulating at least some of said timing differences sensed by said sensing means and storing a net timing difference derived from said accumulated timing differences; and
means for periodically altering the timing of at least one of (a) said playback synchronization signal and (b) said playback pilot signal by said net timing difference stored in said accumulating means.

33. The video playback system of claim 32 further comprising:
means for generating a clock signal;
means connected to said clock generating means and to said pilot and synchronization signal generating means for establishing a frequency ratio between the frequencies of said clock signal and at least one of said playback synchronization and pilot signals; and
means for increasing or decreasing said frequency ratio by a predetermined amount for a predetermined period of time in response to said sensing means so as to reduce said sensed timing differences.

34. The video playback system of claim 33 wherein:
said accumulating means counts the net number J of changes made by said increasing and decreasing means to said frequency ratio;
said altering means temporarily changes said frequency ratio by an amount corresponding to said net number J, so as to reduce said sensed timing differences.

35. The video playback system of claim 32 wherein said altering means is periodically operable at the beginning of each one of said successive tracks for a temporary duration.

36. The video playback system of claim 35 wherein said temporary duration generally corresponds to the period of said playback synchronization pulse signal and precedes the active portion of the video signal recorded on said one track, whereby to generally reduce said sensed timing differences before the active portion of the video signal on said one track.

37. The video playback system of claim 32, 33, 34, 35, or 36 wherein said previously recorded video signal generally occupies a certain frequency band, and wherein said recorded and playback pilot pulse signals are characterized by at least nearly equal pilot pulse frequencies which lie below said video signal frequency band, whereby said pilot pulse signals are generally free of interference with said video signal and are generally free of high frequency magnetic recording losses.

38. The video playback system of claim 32, 33, 34, 35 or 36 further comprising:
   means for receiving an incoming video signal which is to be recorded, said incoming video signal being accompanied by an incoming synchronization pulse signal;
   means for sensing a phase difference between said playback synchronization signal and said incoming synchronization signal, and for changing said frequency of said clock signal so as to compensate said phase difference; and
   means for combining said video signal with said generated pilot signal and recording them together in said successive tracks.

39. The apparatus of claims 1, 7, 11, 14, or 28 wherein said recorded video signal is a time division multiplexed video signal, said apparatus further comprising:
   means for time division de-multiplexing said video signal during playback in synchronism with the locally generated synchronization pulse signal instead of the synchronization signal recorded with said video signal, whereby said de-multiplexing means are virtually free of timing errors attributable to drop outs and skew jump error.

* * * * *